United States Patent
Rao et al.

(10) Patent No.: US 6,587,456 B1
(45) Date of Patent: Jul. 1, 2003

(54) METHOD AND APPARATUS FOR REDUCING LOAD DISTRIBUTION DELAY IN AN INTERNET PROTOCOL SWITCH

(75) Inventors: Sanjay H. Rao, Apex, NC (US); Kenneth W. Oxendine, Raleigh, NC (US); Richard Sigler, Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/335,203

(22) Filed: Jun. 17, 1999

(51) Int. Cl.[7] .............................................. H04L 12/66
(52) U.S. Cl. ................... 370/352; 370/395.52
(58) Field of Search ................................. 370/351–358, 370/359, 360, 373, 386, 389, 390, 395.2, 395.52, 395.6, 395.65, 401, 402, 419, 431, 432, 437; 709/227, 203, 208, 209

(56) References Cited

U.S. PATENT DOCUMENTS 5,774,668 A * 6/1998 Choquier et al. ...... 395/200.53
6,006,272 A * 12/1999 Aravamudan et al. ...... 709/245
6,470,389 B1 * 10/2002 Chung et al. ................ 709/227

FOREIGN PATENT DOCUMENTS

EP        0 865 180 A2      9/1998

OTHER PUBLICATIONS

Liao, W, "Mobile Internet Telephony: Mobile Extensions to H .323", New York, NY Mar. 21, 1999, pp. 12–19.

* cited by examiner

Primary Examiner—Wellington Chin
Assistant Examiner—Brenda Pham
(74) Attorney, Agent, or Firm—Withrow & Terranova, PLLC

(57) ABSTRACT

Method and apparatus for reducing load distribution delay in an internet protocol switch. A system of messaging allows leader and follower cards within a switch to communicate without spanning the external network and without significant involvement by the central computing module within a switch. When a call setup request is received by a leader card, it sends a broadcast message to follower cards within a multicast group. Each follower card responds with address and channel information which enable the leader card to perform load balancing and establish a connection through the appropriate follower card.

12 Claims, 4 Drawing Sheets

METHOD AND APPARATUS FOR REDUCING LOAD DISTRIBUTION DELAY IN AN INTERNET PROTOCOL SWITCH

BACKGROUND

1. Field of the Invention

The present invention is related to load distribution among adapter cards within a telecommunication switch. More particularly, the present invention is related to the distribution of network connections across adapter cards which operate in a "leader/follower" mode. The invention is particularly useful in internet protocol (IP) telephony switching environments.

2. Description of the Problem Solved

Load distribution is an important part of telecommunication switching. Numerous mechanisms exist to manage load distribution across trunk groups in traditional public switched telephone network (PSTN) systems. In these systems, distribution of calls across trunk's and trunk groups is important in maintaining efficient switch operation. In most cases, an algorithm is executed by the computing module within the switch to determine the optimum load distribution for a given situation. Since these PSTN switches maintain circuit switched connections, in which the same connection is maintained from the beginning to the end of a call, the time involved in computing optimum load distribution is insignificant.

IP telephony is becoming increasingly important, as data traffic on the public telecommunication network increases. Load distribution is especially important in an IP telephony switch. Such a switch often acts as a gateway between an IP network and the PSTN or private networks. In such a switch, numerous digital trunk cards allow connections to the switch from the IP network. Load distribution across the trunk cards must be maintained. In current IP telephony switches, load distribution is maintained using a call forwarding method specified in the International Telecommunication Union H.323 standard. In a typical scenario, one digital trunk card within an internet trunk group (ITG) in a switch serves as a "leader card" while other cards serve as "follower cards." Turning to FIG. 1, an initiating endpoint sends a setup message to the leader card within the ITG. The leader card responds with a call proceeding message. At 101 the leader card sends a facility message to the initiating endpoint redirecting the call to the appropriate follower card. The initiating endpoint then sends release complete message to the leader card and initiates a setup message 102 with the designated follower card. Call proceeding, alerting, and connect messages are then exchanged between the follower card and the initiating endpoint.

The above scenario results in even load distribution across internet trunk cards, however, the amount of time it takes to setup a call is excessive. The leader card maintains knowledge of the status and availability of follower cards within the internet trunk group by communicating with the computing module within the switch, and by exchanging packets with follower cards over the network. In addition, the leader card must communicate with the originating endpoint a significant amount of information about the follower card so that the follower card can completely take over the call. What is needed is a way for the leader card within the internet trunk group to quickly and directly determine the status of follower cards in the group, and redirect the call without sending so much information over the network, and without having to communicate with the computing module.

SUMMARY

The present invention solves the above problems by providing an internal communication mechanism for leader and follower cards within a switch. Through the messaging of the invention, a leader card can perform load management functions and negotiate network connections through the follower cards so that an even connection distribution is established. The invention reduces call setup delay by reducing the need for the leader card to negotiate with the initiating endpoint over the network, and by minimizing interaction required with the central computing module in the switch.

According to the present invention, a method of communication is defined between leader and follower cards such that whenever a leader card receives a setup message from an initiating endpoint, a broadcast message is sent to one or more adapter cards in a multicast group of cards. Responses to the message include address information for the follower cards. Using these responses the leader card negotiates the network connection through a follower card so that an even connection distribution is established among available follower cards. The message exchange necessary to carry out the invention occurs directly between leader and follower cards, without spanning the IP network, and with little involvement of the central computing module. In the preferred embodiment the messages are in user datagram protocol (UDP) format. The broadcast and response messages include a message type field, a call ID field, and an IP address and port number field. The response message also includes a channel identification information field.

The invention is typically implemented using a computer program product for a switch. A computer program product includes a media with computer program code which causes the switch involved to perform the necessary operations. The computer program code is loaded into the switch through an input/output device and resides in memory while the switch is in operation. The type of switch in which the invention is implemented usually serves as a trunk interface to an IP network. Such a switch includes a computing module which executes the computer program code which controls the operation of the switch.

The switch also includes the various adapter cards necessary to implement the invention. These adapter cards may be part of a digital trunk controller or peripheral module. In any case they interface into the switch through a bus and each card includes a bus interface as well as a network interface. Additional computer program code or hardware on the adapter cards includes information on formatting and decoding the messages which are used to implement the invention.

DETAILED DESCRIPTION OF SOME PREFERRED EMBODIMENTS

Figure 1:
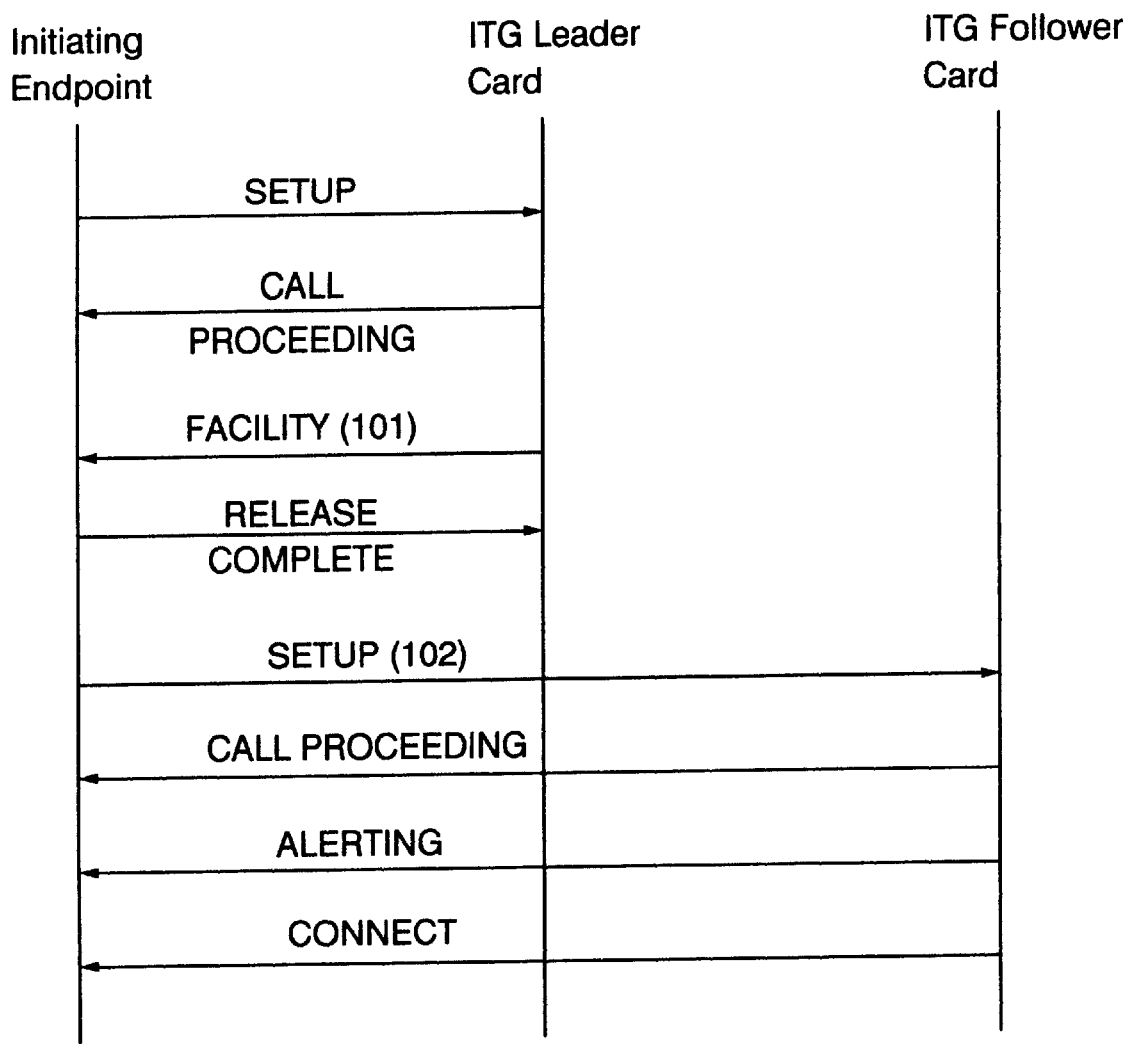
FIG. 1 is a message flow diagram illustrating call setup in a switch of the prior art.
Figure 2:
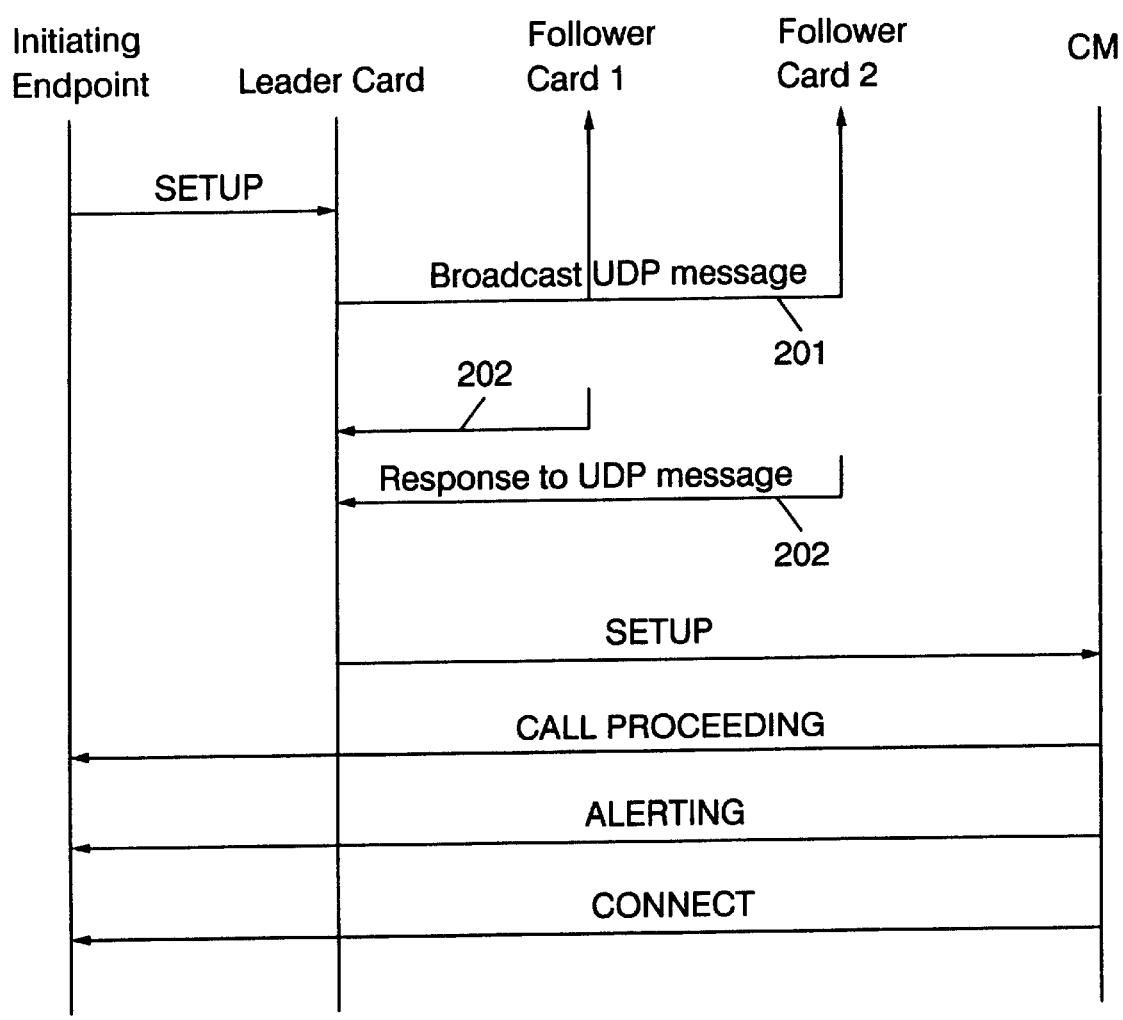
FIG. 2 is a network diagram which illustrates the connection of a switch implementing the present invention to an IP network as well as the leader card and follower card arrangement within the switch.

FIG. 2 is a signal flow diagram which illustrates the method of the present invention. At the outset, an initiating endpoint in the network sends a setup message to the leader card within a switching device which implements the invention. In FIG. 2 the leader card and all other communicating elements on the right side of the diagram are within the switch. The initiating endpoint on the left side of the diagram is connected to the switch over the public network. Each card in the system is configured as a leader, a backup leader, or follower, using simple network management protocol (SNMP).

SNMP is a well-known, industry standard defined by the Internet Engineering Task Force (IETF). SNMP is essentially a communications protocol with basic messaging primitives that allow a network management system to access the management information bases (MIB's) of a given device within a managed network. An MIB is a logical database consisting of configuration, status and statistical information within a device. In reality, the information comprising the MIB may be stored as any combination of switch settings, hardware registers, in-memory variables, or files. MIB variables have a textual object identifier (OID) which is commonly used to refer to the objects. MIB objects are defined as a logical tree structure that allows organizational ownership of subtrees to be defined. The branches of the tree are identified by a dotted decimal notation.

According to the invention, an IP multicast group address is established for all cards within the same multicast group, whether the cards are leaders, backup leaders, or followers. Membership in an IP multicast group is dynamic. The card may join or leave the group anytime. Membership in such a group determines if the card will receive datagrams sent to the multicast group.

When the initiating endpoint sends the setup message, the message is received by the leader. The leader responds by sending a broadcast message 201 to all cards in the leader's multicast group. In the preferred embodiment, the broadcast message 201 is in the form of a UDP query. At least one follower card responds to the broadcast message with a UDP response message 202 in the form of an acknowledgement. If a follower card is too busy to handle traffic, it simply does not respond to the broadcast. Since multiple follower cards may respond to the broadcast, the leader will maintain a dynamic table of follower card addresses. To maintain appropriate load distribution each call is offered in a round-robin fashion thus ensuring equal distribution among available follower cards.

Once the leader card determines which follower card should handle the call, it sends a setup message to the computing module (CM) to direct the call setup. Call proceeding, alerting, and connect messages are then exchanged between the switch in the initiating endpoint. These messages, forwarded by the leader card to the initiating endpoint now contain only the address of the follower card. Communication is now directed towards that follower card; however, the leader card maintains control of signaling. The leader card handles all the signaling associated with the call. In this case the leader card handles the H.225 call control signaling originating from the initiating endpoint. H.225 is a well-known call control signaling portion of the H.323 IP telephony standard promulgated by the International Telecommunication Union (ITU). Signaling messages such as "ALERTING," "CALL PROCEDING," etc. sent by the leader card to the originating endpoint are populated with the IP address of the follower card. The H.225 SETUP message terminates at the leader card. After the UDP query and response phase, the SETUP message is modified to model a Q.931 SETUP message and the SETUP message is forwarded to the computing module (CM) where it is processed. Q.931 is a well-known signaling standard promulgated by the ITU, originally designed for handling call setup in an integrated services digital network (ISDN) environment.

Figure 3:
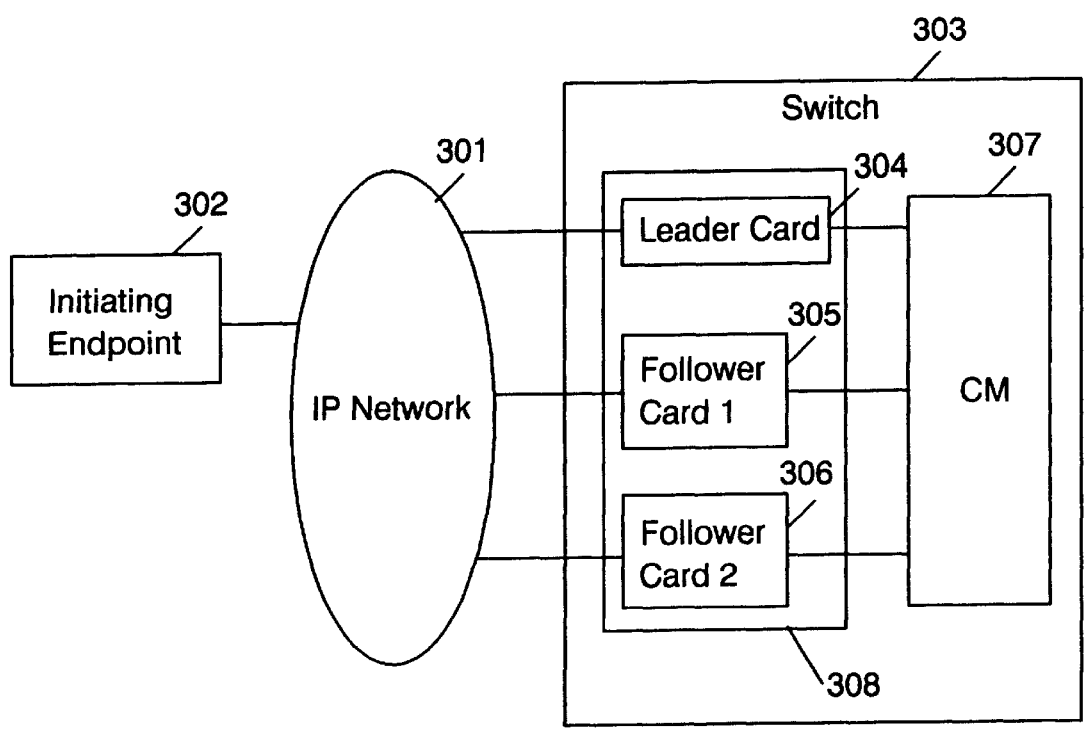
FIG. 3 is a message flow diagram which illustrates the method of the present invention.
Figure 6:
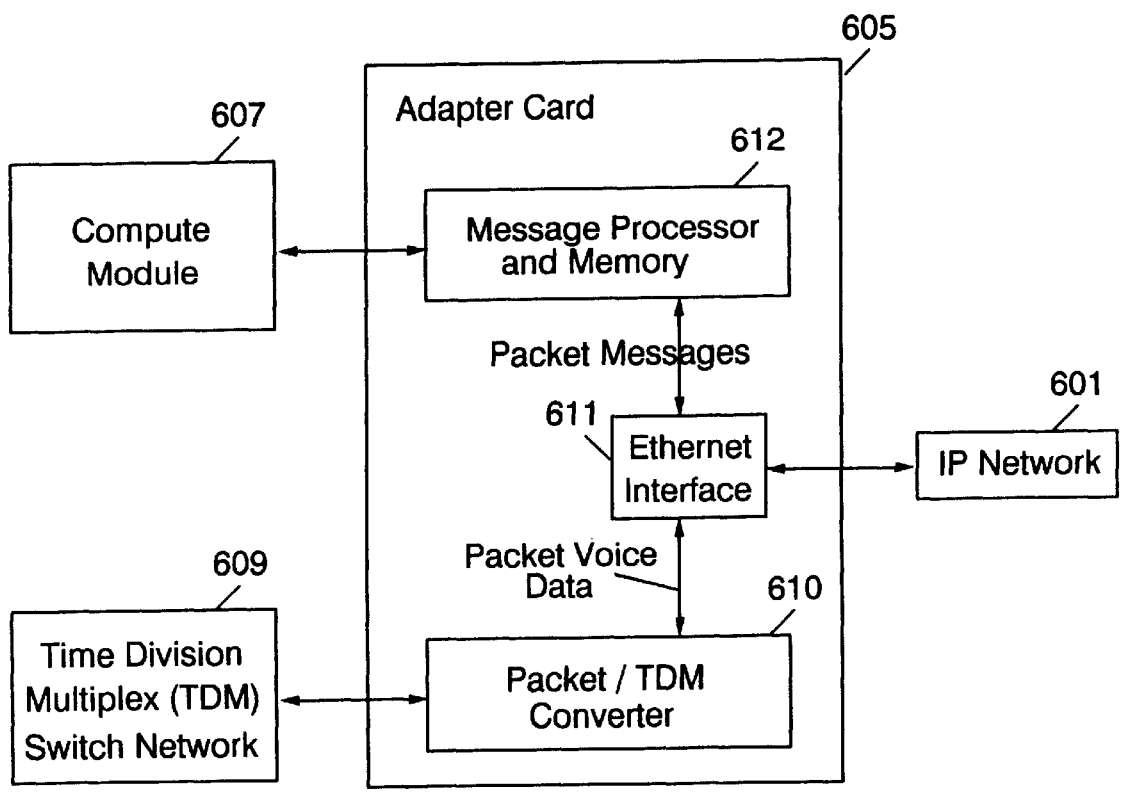
FIG. 6 is a block diagram of an adapter card which implements the present invention within a switch.

FIG. 3 illustrates the operating environment of the present invention. Network 301 is an internet protocol network. In the preferred embodiment, it is the public Internet, however, it can also be a private IP network. Initiating endpoint 302 initiates calls with users of switch 303. Switch 303 includes adapter cards 304, 305, and 306. In this case, 304 is a leader card while 305 and 306 are follower cards. A central computing module, 307, controls the operation of the switch. The central computing module is often simply referred to as the computing module or "CM" as designated in the drawing. In many cases the adapter cards reside in a digital trunk controller or peripheral module 308. According to the invention the leader card communicates with the follower cards through an Ethernet or similar connection. The adapter cards also communicate with the CM, if necessary, through a bus. In FIG. 3, the backbone or trunk side of the switch 303 is not shown for simplicity. However, the switch is connected to a time division multiplex (TDM) network which forms the backbone of the PSTN. The adapter cards also communicate with this network, as shown in FIG. 6, which is discussed in further detail below.

Figure 4:
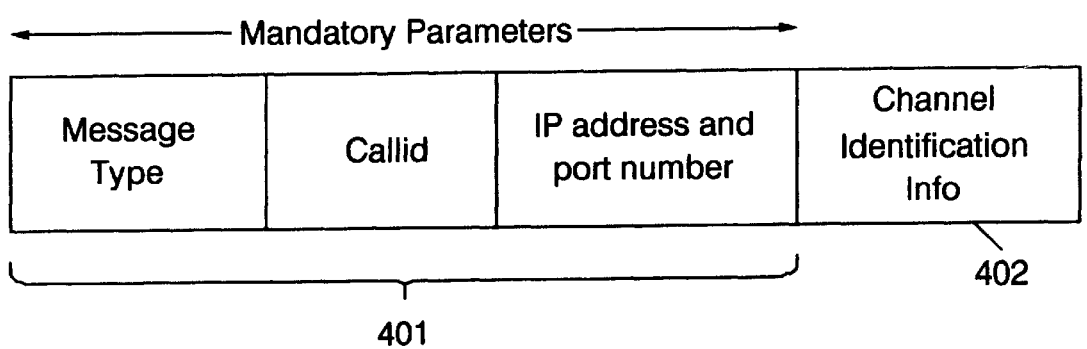
FIG. 4 is a diagram of the UDP message of the present invention.

FIG. 4 illustrates an example of a UDP message which can be used to implement the present invention. Fields 401 are present in every message, whether it is a broadcast message or response message. These fields include the message type field, callid field, and the IP address and port number field. In the preferred embodiment, the message type is indicated by a "Q" for query, an "R" for response, a "C" for close logical channel message, or an "A" for close logical channel message acknowledgement. Field 402, the channel identification information field, would only be sent by a follower card as part of a response. The channel information field is an identification element of the previously described Q.931 signaling protocol.

Figure 5:
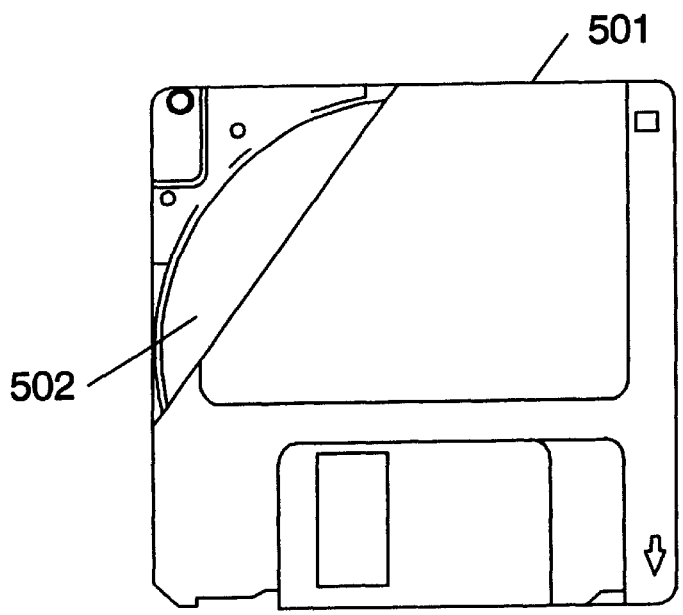
FIG. 5 illustrates a media containing computer program code which enables a switch to implement present invention.

Appropriate computer program code in combination with hardware implements many of the elements of the present invention. Some of the code controls the operation of the switch using the CM. This computer program code is often stored on storage media. This media can be a diskette, hard disk, CD-ROM, or tape. Thee media can also be a memory storage device or collection of memory storage devices such as read-only memory (ROM) or random access memory (RAM). Additionally, the computer code can be transferred to the switch over some type of data network. FIG. 5 illustrates one example of a media. FIG. 5 shows a storage device of the type where magnetic media 502 is enclosed in a protective jacket 501. Magnetic field changes over the surface of the magnetic media 502 are used to encode the computer program code. In this way the computer program code is stored for transport and later retrieval.

The adapter cards also need to be able to understand and generate the new UDP messages. In the preferred embodiment, the adapter cards contain hardware and software which allow them to implement the invention. An adapter card block diagram is shown in FIG. 6. In FIG. 6, adapter card 605 contains a message processor and memory 612, an Ethernet interface 611, and a packet/TDM converter 610. The message processor and memory contain program code which enable them to control the operation of the card and implement the invention. The message processor and memory 612 exchange information with the computing module 607 through a peripheral module, which is not shown for simplicity but which has been previously discussed. The packet/TDM converter 610 converts IP packets to data which is formatted to be transferred over the TDM backbone switch network 609. The IP network 601 corresponds to IP network 301 of FIG. 3.

I have described specific embodiments of my invention. One of ordinary skill in the networking and computing arts will quickly recognize that the invention has other applications in other environments. In fact, many embodiments and implementations are possible. The following claims are in no way intended to limit the scope of the invention to the specific embodiments described.

We claim:

1. A method in a switch of establishing a network connection with an initiating endpoint, the method comprising the steps of:

receiving at a leader card, a setup message from the initiating endpoint;

broadcasting a broadcast message to one or more follower cards in multicast group;

receiving at the leader card, one or more response messages to the broadcast message, each response message including address information for one follower card; and negotiating the network connection through a follower card so that an even connection distribution is established among available follower cards.

2. The method of claim 1 wherein the broadcast and response messages are in user datagram protocol (UDP) format.

3. The method of claim 2 wherein the broadcast and response messages include a message type field, a callid field, and an internet protocol (IP) address and port number field.

4. A method in a switch of establishing a network connection with an initiating endpoint, the method comprising the steps of:

receiving at a leader card, a setup message from the initiating endpoint;

broadcasting a broadcast message to one or more follower cards in multicast group;

receiving at the leader card, one or more response messages to the broadcast message, each response message including address information for one follower card; and negotiating the network connection through a follower card so that an even connection distribution is established among available follower cards;

wherein the broadcast and response messages are in user datagram protocol (UDP) format;

wherein the broadcast and response messages include a message type field, a callid field, and an internet protocol (IP) address and port number field; and wherein the response message also-includes a channel identification information field.

5. Apparatus for establishing a network connection with an initiating endpoint, the apparatus comprising:

means for receiving a setup message from initiating endpoint;

means for broadcasting a broadcast message to or more follower cards in a multicast group;

means for receiving at a leader card, one or more response messages to the broadcast message, each response including address information for one follower card; and means for negotiating the network connection through a follower card so that an even connection distribution is established among available follower cards.

6. The apparatus of claim 5 wherein the broadcast and response messages are in user datagram protocol (UDP) format.

7. The apparatus of claim 6 wherein the broadcast and response messages include a message type field, a callid field, and an internet protocol (IP) address and port number field.

8. Apparatus for establishing a network connection with an initiating endpoint, the apparatus comprising:

means for receiving a setup message from initiating endpoint;

means for broadcasting a broadcast message to or more follower cards in a multicast group;

means for receiving at a leader card, one or more response messages to the broadcast message, each response including address information for one follower card; and means for negotiating the network connection through a follower card so that an even connection distribution is established among available follower cards;

wherein the broadcast and response messages are in user datagram protocol (UDP) format;

wherein the broadcast and response messages include a message type field, a callid field, and an internet protocol (IP) address and port number field; and wherein the response message also includes a channel identification information field.

9. A switch for establishing a network connection with an initiating endpoint, the switch including a leader card and at least one follower card, the switch further including a computer program comprising:

computer program code for receiving, at the leader card, a setup message from the initiating endpoint;

computer program code for broadcasting a broadcast message for one or more adapter cards in a multicast group;

computer program code for receiving at a leader card, one or more response messages to the broadcast message, each response including address information for one follower card; and computer program code for negotiating the network connection through a follower card so that an even connection distribution is established among available follower cards.

10. The switch of claim 9 wherein the broadcast and response messages are in user datagram protocol (UDP) format.

11. The switch of claim 10 wherein the broadcast and response messages include a message type field, a callid field, and an internet protocol (IP) address and port number field.

12. The switch of claim 11 wherein the response message also includes a channel identification information field.

* * * * *